US012571525B2

(12) United States Patent
Jiang et al.

(10) Patent No.: US 12,571,525 B2
(45) Date of Patent: Mar. 10, 2026

(54) REVERSE-LOCK HAND HOLDING ASSEMBLY AND STAGE LIGHT FIXTURE HAVING SAME

(71) Applicant: Guangzhou Haoyang Electronic Co., Ltd., Guangzhou (CN)

(72) Inventors: Weikai Jiang, Guangzhou (CN); Xindong Liu, Guangzhou (CN); Wenfei Huang, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 34 days.

(21) Appl. No.: 18/400,674

(22) Filed: Dec. 29, 2023

(65) Prior Publication Data

US 2025/0075894 A1 Mar. 6, 2025

(30) Foreign Application Priority Data

Aug. 31, 2023 (CN) .......................... 202311119103.5

(51) Int. Cl.
*F21V 21/40* (2006.01)
*F21V 17/00* (2006.01)
*F21V 21/28* (2006.01)
*F21W 131/406* (2006.01)

(52) U.S. Cl.
CPC .............. *F21V 21/40* (2013.01); *F21V 21/28* (2013.01); *F21V 17/007* (2013.01); *F21V 21/406* (2013.01); *F21W 2131/406* (2013.01)

(58) Field of Classification Search
CPC ...... F21V 21/406; F21V 17/007; F21V 21/40; F21V 2131/406; Y10T 292/096; Y10T 292/097; Y10T 292/0969; Y10T 292/0994; Y10T 292/0971; Y10T 292/1024; Y10T 292/0964; Y10T 292/0967; Y10T 292/1015; Y10T 292/1016; Y10T 292/1023; Y10T 292/1028;

(Continued)

(56) References Cited

U.S. PATENT DOCUMENTS 3,924,775 A * 12/1975 Andreaggi ............. F16M 11/10
220/756
4,510,779 A * 4/1985 Ahad ......................... E05B 5/00
292/DIG. 31

(Continued)

*Primary Examiner* — Zheng Song
*Assistant Examiner* — James M Endo
(74) *Attorney, Agent, or Firm* — Muncy, Geissler, Olds & Lowe, P.C.

(57) ABSTRACT

A reverse-lock hand holding assembly includes a base support and a handle pivoted to the base support, which handle has a folded state and an unfolded state. A locking plate capable of sliding parallel to the base support is arranged on the base support for locking the handle against reverse rotation thereof, which locking plate has a first position and a second position, and the rotation shaft of the handle is provided with a locking block. The locking plate releases the handle and allows the handle to rotate between the folded state and the unfolded state when at the first position, and the locking block is abutted against the locking plate toward the base support to limit the handle to reversely rotate to the folded state from the unfolded state when the locking plate is at the second position.

20 Claims, 5 Drawing Sheets

(58) Field of Classification Search
CPC ......... Y10T 292/1034; Y10T 292/1037; Y10T 292/1038; Y10T 70/5761; B65D 25/2841
See application file for complete search history.

(56) References Cited

U.S. PATENT DOCUMENTS

| | | | | | |
|---|---|---|---|---|---|
| 5,457,971 | A * | 10/1995 | Yamada | E05B 5/003 | 292/DIG. 31 |
| 5,465,462 | A * | 11/1995 | Yamada | E05C 3/122 | 292/DIG. 31 |
| 5,469,725 | A * | 11/1995 | Yamada | E05B 5/003 | 292/DIG. 31 |
| 5,975,594 | A * | 11/1999 | Sandhu | E05B 83/30 | 292/DIG. 31 |
| 6,230,925 | B1 * | 5/2001 | Hardigg | B65D 25/2835 | 220/761 |
| 6,398,033 | B1 * | 6/2002 | Wu | H01L 21/67379 | 206/711 |
| 8,079,446 | B2 * | 12/2011 | Nemoto | B60R 7/10 | 223/89 |
| 9,016,642 | B1 * | 4/2015 | Ay | F16B 45/00 | 248/205.1 |
| 9,278,782 | B2 * | 3/2016 | Fjelland | B65D 25/2841 | |
| 2005/0093304 | A1 * | 5/2005 | Figge | E05B 63/20 | 292/173 |
| 2006/0255596 | A1 * | 11/2006 | Yong | E05C 1/14 | 292/173 |
| 2009/0323364 | A1 * | 12/2009 | Bornhorst | F21V 21/30 | 362/418 |
| 2011/0074169 | A1 * | 3/2011 | Chang | G11B 33/124 | 292/164 |
| 2016/0259381 | A1 * | 9/2016 | Geng | G06F 1/182 | |
| 2019/0390476 | A1 * | 12/2019 | Kightlinger | E05B 5/003 | |
| 2021/0198926 | A1 * | 7/2021 | Tsorng | E05C 1/12 | |

* cited by examiner

REVERSE-LOCK HAND HOLDING ASSEMBLY AND STAGE LIGHT FIXTURE HAVING SAME

CROSS REFERENCE TO RELATED APPLICATIONS

The present application claims priorities from Chinese Application No. CN 202311119103.5 filed on Aug. 31, 2023, all of which are hereby incorporated herein by reference.

TECHNICAL FIELD

The present invention relates to the technical field of stage light fixtures, and more particularly, relates to a reverse-lock hand holding assembly and a stage light fixture having the same.

BACKGROUND

The handle of the existing stage light fixture is generally arranged on the sides of the base thereof. For the stage light fixture with large power, it is usually of high weight like 30 kg to 60 kg. In such situation, it may be very hard for the installer to lift the stage light fixture through the handle during installation, particularly when the stage light fixture is firstly on the floor.

As such, a foldable handle is further provided on the pivoting arm of the stage light fixture, which is convenient to lift the stage light fixture and will not bring adverse esthetic influence thereon. However, such handle can only be folded from bottom to up and then stopped at certain angle to allow lifting, and the handle will be folded downward at folded state for storage, which thus also requires the installer to bend over large angle to hold the handle, making the lifting of the stage light fixture relatively difficult. Additionally, it is not aesthetically pleasing due to downward design at the folded state for storage, which is different from the convention stage light fixture in upward design at the folded state.

SUMMARY

It is therefore desirable to provide a reverse-lock hand holding assembly in the present invention, which can achieve holding and lifting by locking the handle against reverse rotation when the handle is rotated to unfolded state from folded state.

According to the present invention, a reverse-lock hand holding assembly includes a base support, and a handle pivoted to the base support with the rotation shaft of the handle parallel to the base support. A locking plate capable of sliding parallel to the base support is provided on the base support for locking the handle against reverse rotation of the handle. The rotation shaft of the handle is provided with a locking block cooperated with the locking plate. The handle has a folded state for storage and an unfolded state for holding and lifting. Accordingly, the locking plate has a first position corresponding to the folded state of the handle and a second position corresponding to the unfolded state of the handle. It is configured that when the locking plate is at the first position, the handle is released by the locking plate and allowed to rotate between the folded state and the unfolded state, i.e., rotate from the folded state to the unfolded state or rotate from the unfolded state to the folded state, and when the locking plate is at the second position, the locking block is abutted against the locking plate toward the base support to limit the handle to reversely rotate to the folded state from the unfolded state.

In the present invention, the handle is pivoted to the base support with the rotation shaft thereof parallel to the base support, so that when the locking plate is at the first position, the locking block is released by the locking plate to allow the handle to rotate to the unfolded state from the folded state, and then or simultaneously the locking plate is slidden to the second position relative to the base support, making the locking block abutted against the locking plate toward the base support to limit the reverse rotation of the handle from the unfolded state to the folded state. When the locking plate is in turn moved to the first position from the second position relative to the base support, the locking block is released by the locking plate to allow reverse rotation of the handle from the unfolded state to the folded state. In such configuration, the handled can be designed upward when at the folded state, which is aesthetic pleasing and as well as convenient for the installer to hold the handle with less bending angle and labor saving. In addition, the locking block is in surface-to-surface contact with the locking plate when abutted against the locking plate toward the base support, at the unfolded state of the handle and the second position of the locking plate, causing that the locking plate can suffer large force form the locking block without damage, thus heavy objects can be lifted through the handle.

In an advantageous way, the locking plate may be moved between the first position and the second position by translating relative to the base support, as the driving element and/or the guiding element required for translating of the locking plate is easy to design or obtain.

In particular, in order to make the blocking plate move between the first position and the second position by translating in a specific direction, the base support may be provided with at least one guide post and the blocking plate may be provided with at least one elongated guide hole corresponding to the guide post, the blocking plate thus can achieve change of position through cooperation between the guide post with the guide hole.

In the present invention, when the handle is at the unfolded folding-state and the locking plate is correspondingly at the second position, a locking plane of the locking block is preferably abutted against a flat plane of the locking plate to limit the revers rotation of the handle to the folded state. As such, the surface-to-surface contact is achieved, which can increase force area between the locking block and the locking plate, so that the locking plate can suffer more force from the locking block, thereby in turn reducing requirement of the strength of the locking block.

Additionally, to make the locking plate easily move to the first position from the second position, the locking block may further include an arc surface connected with the locking plane in the present invention, such arc surface can allow the handle to continuously forward rotate from the unfolded state and release the locking plate.

Preferably, the locking plate is provided with an avoiding hole, the free end of the locking block can freely enter and exit from the avoiding hole with the rotation of the handle when the locking plate is at the first position, thereby releasing the locking block and allowing the handle to rotate to the unfolded state from the folded state or reversely rotate to the folded state from the unfolded state.

Preferably, in the present invention, the free end of the locking block is abutted against the locking plate to limit the moving of the locking plate when the handle is at the folded state and the locking plate is at the first position, thus the locking plate can be maintained at the first position without any shaking.

Particularly, a reset element can be further included, which can continuously exert force to the locking plate to make the locking plate tend to move from the first position to the second position. In this case, when the handle forward rotates to leave away from the folded state and the locking plate is released, the reset element will drive the locking plate to automatically move to the second position from the first position and the handle will be naturally locked by the locking plate to avoid reverse rotation when the handle rotating to the unfolded state.

Preferably, in order to avoid excessive forward rotation and avoid noise caused by collision with the base support when the handle forward rotates to the unfolded state, a resistance element is further provided, which can continuously exert reverse force to the handle during forward rotating to the unfolded state from the folded state.

Specifically, the rotation shaft is connected to a protrusion structure, the base support is provided with a spring sheet, the spring sheet is abutted against the protrusion structure to exert reverse force to the handle. The combination of the protrusion structure and the spring sheet forms the resistance element. With such configuration, the spring sheet can produce a resistance in the forward rotation of the handle to avoid excessive forward rotation and noise caused by collision with the base support when the handle forward rotates to the unfolded state.

The handle at the folded state is required not to easily shake and to prevent the handle from out of the folded state, the handle in the present invention may be temporarily fastened to the base support by a snap-fitting structure when at folded state.

The present invention further provides a stage light fixture, which includes a light head for projecting light beams, a pivoting arm for supporting the light head to rotate, and a base for supporting the pivoting arm to rotate, and further includes the hand holding assembly mentioned above which is arranged on the pivoting arm. The light beams from the light head can be projected to any direction with the cooperation of the pivoting arm and the base. The hand holding assembly arranged on the arm is convenient for the installer to hold the handle with less bending angle, compared to arranged on the base.

In a preferable embodiment, the rotation shaft of the handle is arranged at the side of the pivoting shaft of the light head close to the base. In such case, when the handle is designed upward at the folded state, there is enough space for the handle and simultaneously ensuring the handle not exceeding the upper end of the pivoting arm.

To accommodate the handle when at the folding state, the housing of the pivoting arm is provided with an accommodating recess according to the handle at the folding state, the handle thus may not project from the pivoting arm too much and meet the requirement of aesthetic pleasing.

In the present invention, the locking plate of the hand holding assembly may be formed a pushing and pulling plate for pushing and pulling of the locking plate, the other end of the pushing and pulling plate is extending from the housing of the pivoting arm. As a result, the locking plate can easily move between the first position and the second position by manual operation of the pushing and pulling plate.

Preferably, the handle of the hand holding assembly is in U shape with two ends forming an opening of the U shape, the two ends of the U shape each is pivoted to the base support via a rotation shaft and arranged on the two sides of the pivoting shaft of the light head. Each rotation shaft can be locked in reverse direction with the cooperation of one locking block and one locking plate, and the two locking plates of each handle share one pushing and pulling plate. In such configuration, the handle is not prone to shaking and will be more stable, and the locking plate allows to be pushed and pulled by one hand of the installer.

Additional advantages, features and possible applications of the present invention will be apparent from the description which follows, in which reference is made to the embodiments illustrated in the drawings.

DETAILED DESCRIPTION

Figure 1:
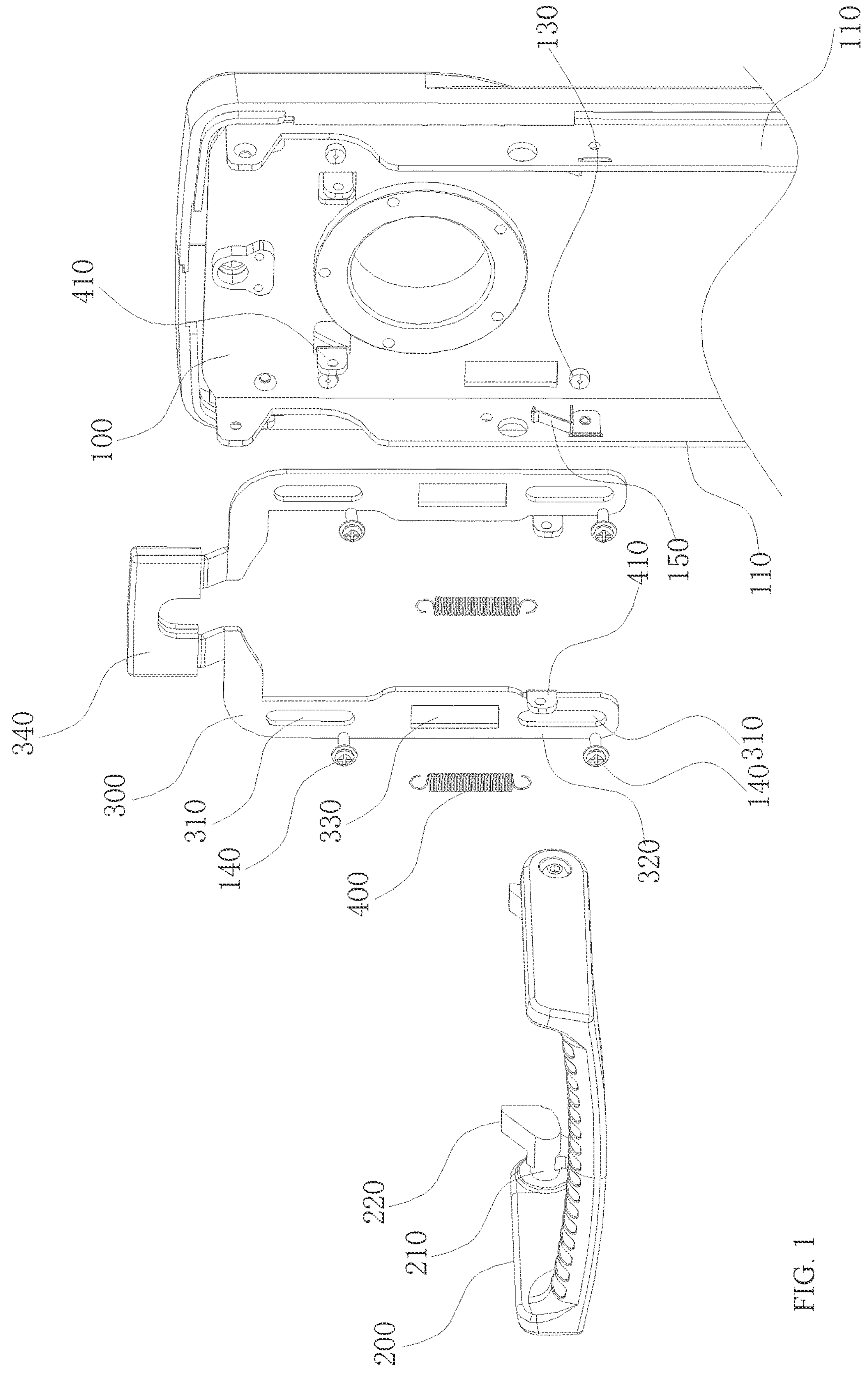
FIG. 1 is an exploded view of a reverse-lock hand holding assembly according to an embodiment of the present invention.

The accompanying drawings are for exemplary illustration only, and should not be construed as limitations on this invention. In order to better illustrate the present embodiment, some parts of the accompanying drawings may be omitted, enlarged or reduced, and do not represent the size of actual products. For those skilled in the art, it is understandable that certain well-known structures and descriptions thereof may be omitted in the drawings. The positional relationship described in the drawings is only for exemplary illustration, and should not be construed as a limitation on this invention.

Figure 2:
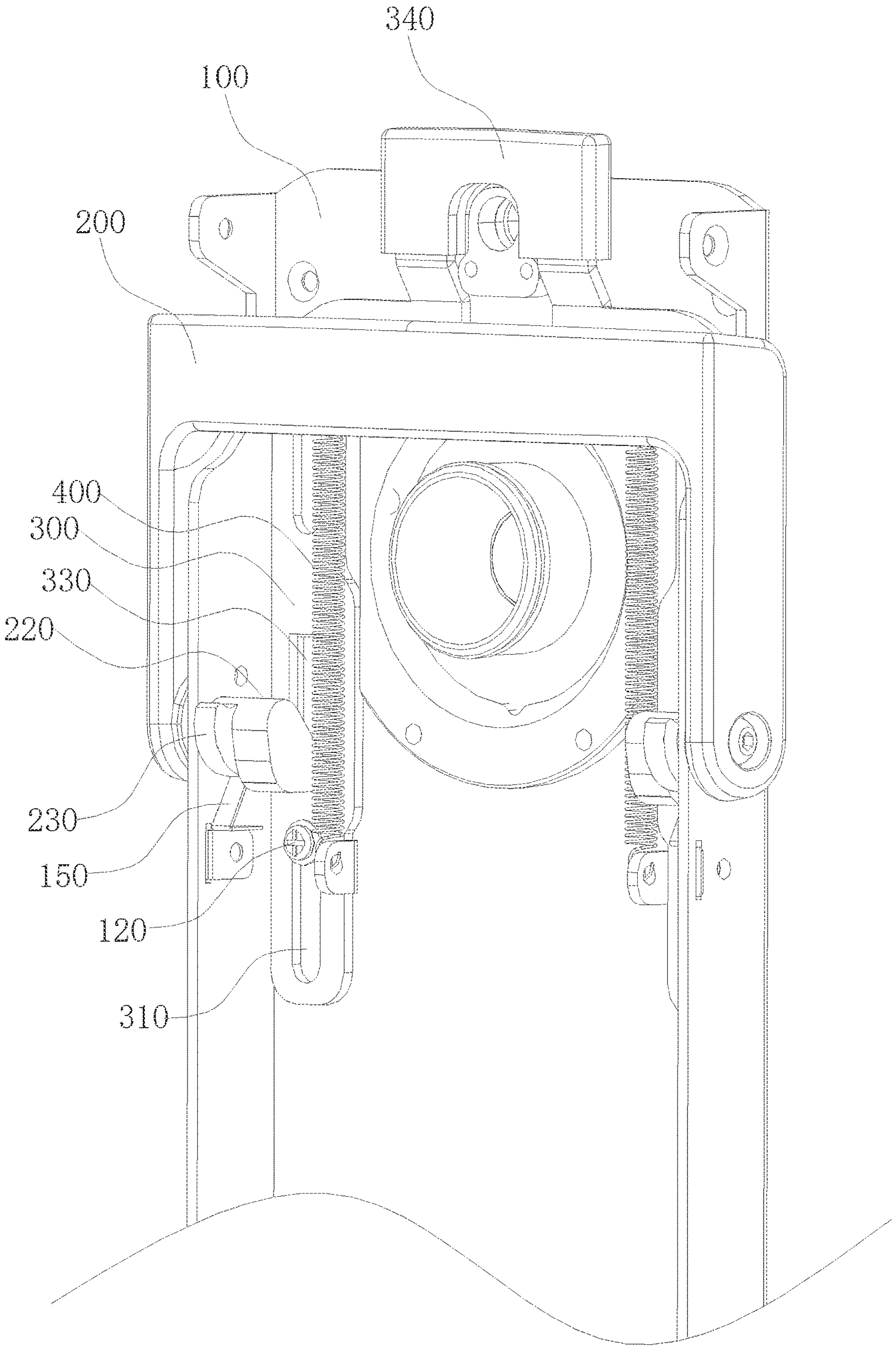
FIG. 2 is a perspective view of a reverse-lock hand holding assembly according to an embodiment of the present invention.
Figure 3:
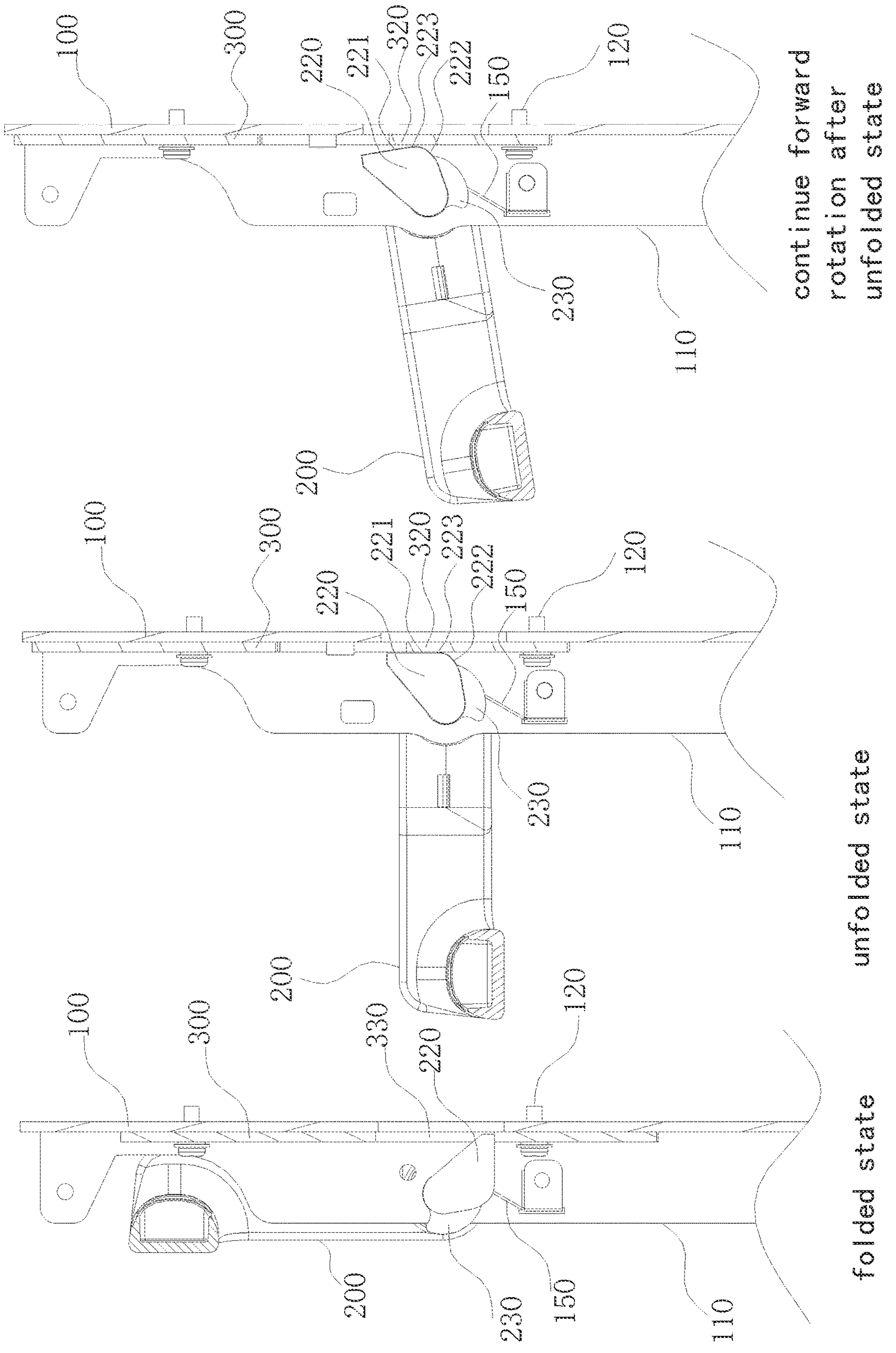
FIG. 3 is a section view showing a handle at different states.

FIGS. 1-3 provide a reverse-lock hand holding assembly according to an embodiment of the present invention. The reverse-lock hand holding assembly includes a base support 100 and a handle 200 pivoted to the base support 100 with the rotation shaft 210 of the handle 200 parallel to the base support 100. A locking plate 300 capable of sliding parallel to the base support 100 is provided on the base support 100 for locking the handle 200 against reverse rotation of the handle 200. The rotation shaft 210 of the handle 200 is provided with a locking block 220 cooperated with the locking plate 300. The handle 200 includes a folded state for storage and an unfolded state for holding and lifting. Accordingly, the locking plate 300 has a first position corresponding to the folded state of the handle 200 and a second position corresponding to the unfolded state of the handle 200. It is configured that when the locking plate 300 is at the first position, the handle 200 is released by the locking plate 300 to allow the handle 200 to rotate between the folded state and the unfolded state, i.e., rotate from the folded state to the unfolded state or rotate from the unfolded state to the folded state, and when the locking plate 300 is at the second position, the locking block 220 is abutted against the locking plate 300 toward the base support 100 to limit the handle 200 to reversely rotate to the folded state from the unfolded state.

According to the present embodiment, the handle 200 is pivoted to the base support 100 with the rotation shaft 210 thereof parallel to the base support 100, so that when the locking plate 300 is at the first position, the locking block 220 is released by the locking plate 300 to allow the handle 200 to rotate to the unfolded state from the folded state, and then or simultaneously the locking plate 300 is slidden to the second position relative to the base support 100, making the locking block 220 abutted against the locking plate 300 toward the base support 100 to limit the reverse rotation of the handle 200 from the unfolded state to the folded state. When the locking plate 300 is in turn moved to the first position from the second position relative to the base support 100, the locking block 220 is released by the locking plate 300 to allow reverse rotation of the handle 200 from the unfolded state to the folded state. In such configuration, the handled 200 can be designed upward when at the folded state, which is aesthetic pleasing and as well as convenient for the installer to hold the handle 200 with less bending angle and labor saving. In addition, the locking block 220 is in surface-to-surface contact with the locking plate 300 when abutted against the locking plate 300 toward the base support 100, at the unfolded state of the handle 200 and the second position of the locking plate 300, causing that the locking plate 300 can suffer large force form the locking block 220 without damage, thus heavy objects can be lifted through the handle 200.

In the present embodiment, the base support 100 is bended into a side plate 110 at each side thereof, and the handle 200 is pivoted to each side plate 110.

Preferably, the folded state of the handle 200 in the present embodiment refers to where the handle 200 is substantially fitted to the base support 100, namely the handle 200 is rotated to be parallel to the base support 100, and the unfolded state of the handle 200 in the present embodiment refers to where the handle 200 is substantially perpendicular to the base support 100. It should be conceivable that the handle 200 at the unfolded state can be in any angle relative to the base support 100, as soon as it is easy to hold and lift.

In a preferable embodiment, the locking plate 300 is moved between the first position and the second position by translating relative to the base support 100. The driving element and/or the guiding element required for translating of the locking plate is easy to obtain.

However, in other embodiments, the locking plate may also be moved between the first position and the second position by rotating or swinging relative to the base support.

In a preferable embodiment, the base support 100 is provided with at least one guide post 120 and the blocking plate 300 is provided with at least one elongated guide hole 310 corresponding to the guide post 120, the blocking plate 300 thus can achieve change of position through cooperation between the guide post 120 with the guide hole 310. In such configuration, the blocking plate 300 can be moved between the first position and the second position by translating in a specific direction.

The guide post 120 has a cross section in circular shape and the guide hole 310 has a width essentially equal to the diameter of the cross section of the guide post 120. Especially two guide posts 120 and two guide holes 310 are provided and the two guide holes 310 have same length direction, thereby avoiding the locking plate 300 from rotating around the guide post 120, and achieving translating in a specific direction. However, in other embodiments, the guide post 120 may also be the shape of square and the guide hole 310 has a width essentially equal to the width of the cross section of the guide post 120, in this case, only one guide post 120 and one guide hole 310 are required to avoid the locking plate 300 from rotating around the guide post 120, and thus achieving translating in a specific direction.

In the present embodiment, the base support 100 is provided with at least one convex post 130, screws 140 are respectively passed through each guide hole 310 to connect the corresponding convex post 130, and the width of the convex post 130 is greater than that of the stud of the screw 140. The convex post 130 and the corresponding screw 140 are thus combined into the guide post 120. In order to avoid the locking plate 300 from moving along the guide post 120, a limiting groove is formed between the nut of the screw 140 and the guide post 120.

Specifically, when the handle 200 is at the unfolded state and the locking plate 300 is correspondingly at the second position, a locking plane 221 of the locking block 220 is abutted against a flat plane 320 of the locking plate 300 to limit the revers rotation of the handle 200 to the folded state. The surface-to-surface contact can increase force area between the locking block 220 and the locking plate 300, so that the locking plate 300 can suffer more force from the locking block 220, thereby in turn reducing requirement of the strength of the locking block 220.

In this embodiment, the handle 200 is substantially perpendicular to the base support 100 when the locking plane 221 of the locking block 220 is abutted against the flat plane 320 of the locking plate 300.

The locking block 220 further includes an arc surface 222 connected to the locking plane 221. Such arc surface 222 allows the handle 200 to continuously rotate from the unfolded state and release the locking plate 300. In such configuration, the locking plate 300 can be easily moved to the first position from the second position.

In the present embodiment, the connecting line 223 connecting the locking plane 221 and the arc surface 222 is parallel to the centerline of the rotation shaft 210, and the plan formed by the connecting line 223 and the centerline of the rotation shaft 210 is essentially perpendicular to the locking plane 221.

According to a preferable embodiment, the locking plate is provided with an avoiding hole 330, the free end of the locking block 220 can freely enter and exit from the avoiding hole 330 with the rotation of the handle 200 when the locking plate 300 is at the first position, thereby releasing the locking block 220 and allowing the handle 200 to rotate to the unfolded state from the folded state or reversely rotate to the folded state from the unfolded state.

Particularly, the avoiding hole 330 is in shape of rectangle, the length thereof has the same direction with the moving direction of the locking plate 300. Therefore, the free end of the locking block 220 can move in the avoiding hole 330 for a distance with the rotation of the handle 200.

Preferably, the free end of the locking block 220 is abutted against the locking plate 300 to limit the moving of the locking plate 300 when the handle 200 is at the folded state and the locking plate 300 is at the first position, so that the locking plate 300 can be maintained at the first position without any shaking.

A reset element 400 is further included according to a preferable embodiment, which can continuously exert force to the locking plate 300 to make the locking plate 300 tend to move from the first position to the second position. In this case, when the handle 200 forward rotates to leave away from the folded state and the locking plate 300 is released, the reset element 400 will drive the locking plate 300 to automatically move to the second position from the first position and the handle 200 is naturally locked by the locking plate 300 to avoid reverse rotation when the handle 200 rotating to the unfolded state.

Particularly, the reset element includes a spring, one end thereof is connected to the base support 100 and the other end thereof is connected to the locking plate 300, accordingly, the base support 100 and the locking plate 300 each has a connector 410 protruding therefrom for connecting the reset element 400.

According to the present embodiment, the free end of the locking block 220 is abutted against the side wall of the avoiding hole 330 to limit the locking plate 300, while the free end of the locking block 220 will be not abutted against the avoiding hole 330 when the handle 200 is not at the folded state, where the locking plate 300 will automatically move to the second position from the first position under the action of the reset element 400.

According to a preferable embodiment, a resistance element is further provided, which can continuously exert reverse force to the handle 200 during forward rotating to the unfolded state from the folded state.

In particular, the rotation shaft 210 is connected to a protrusion structure 230, the base support 100 is provided with a spring sheet 150, and the spring sheet 150 is abutted against the protrusion structure 230 to exert reverse force to the handle 200. The combination of the protrusion structure 230 and the spring sheet 150 forms the resistance element. With such configuration, the spring sheet 150 produces a resistance in the forward rotation of the handle 200 to avoid excessive forward rotation and avoid noise caused by collision with the base support 100 when the handle 200 forward rotates to the unfolded state.

More particularly, the height of the protrusion structure 230 protruding from the rotating shaft 210 is gradually increased in the reverse direction of the rotation of the handle 200. In such case, the handle 200 may suffer gradually increased force from the spring sheet 150 with the handle 200 forward rotating.

It should be appreciated that the resistance element may also be magnets, having same magnetic pole or with the same magnetic pole opposite each other, respectively arranged on the handle 200 and the base support 100, or may also be a spring element connected the handle 200 to the base support 100.

The handle 200 is temporarily fastened to the base support 100 by a fastener such as a snap-fitting structure when at folded state, so that the handle at the folded state may not easily shake and prevent the handle from out of the folded state.

Specifically, the snap-fitting structure includes a projection and a recess. The projection is formed by the end of a spring arm and preferably arranged on the base support 100, and the recess is arranged in the handle 200.

Figure 4:
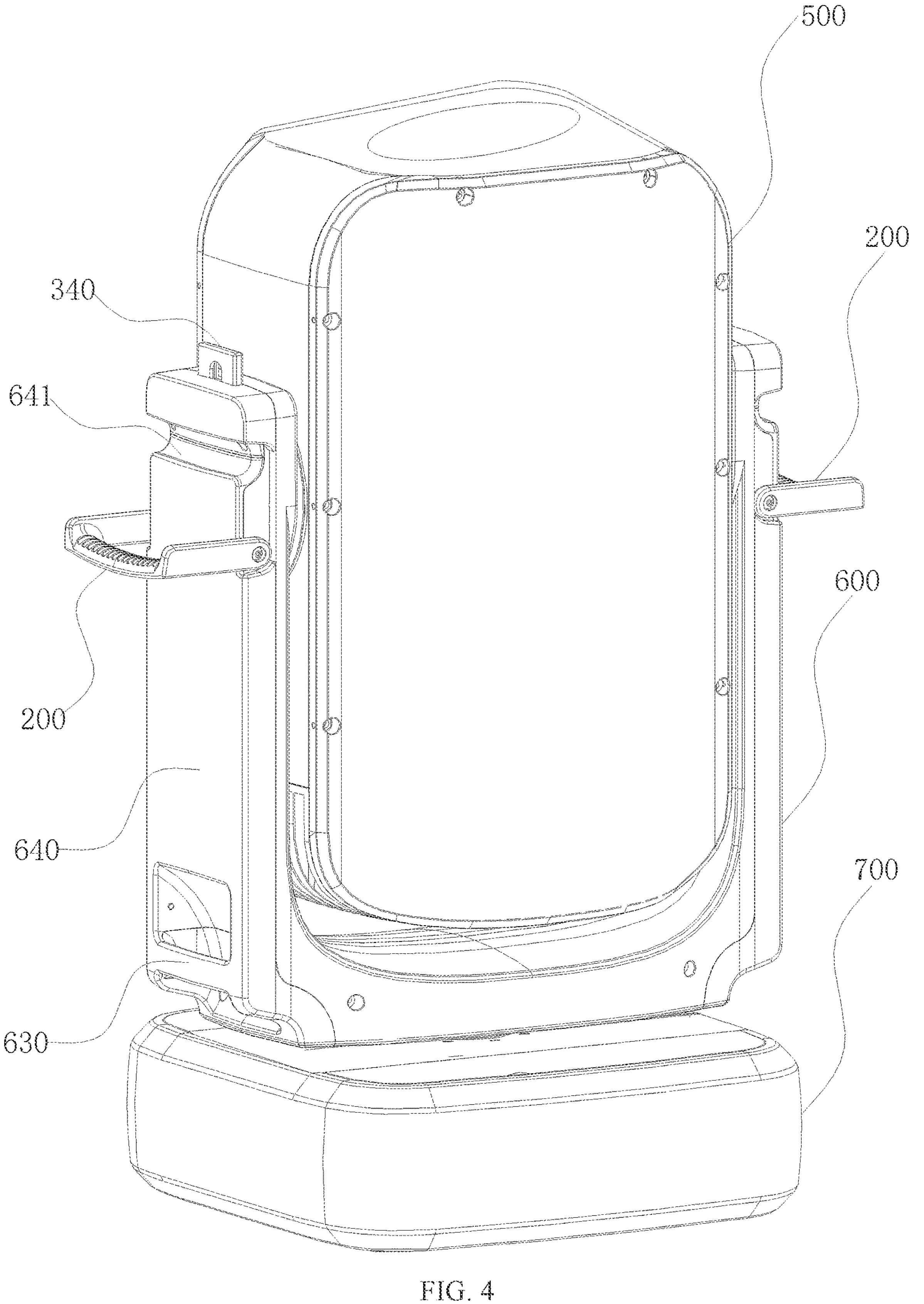
FIG. 4 is a perspective view of a stage light fixture according to an embodiment of the present invention.
Figure 5:
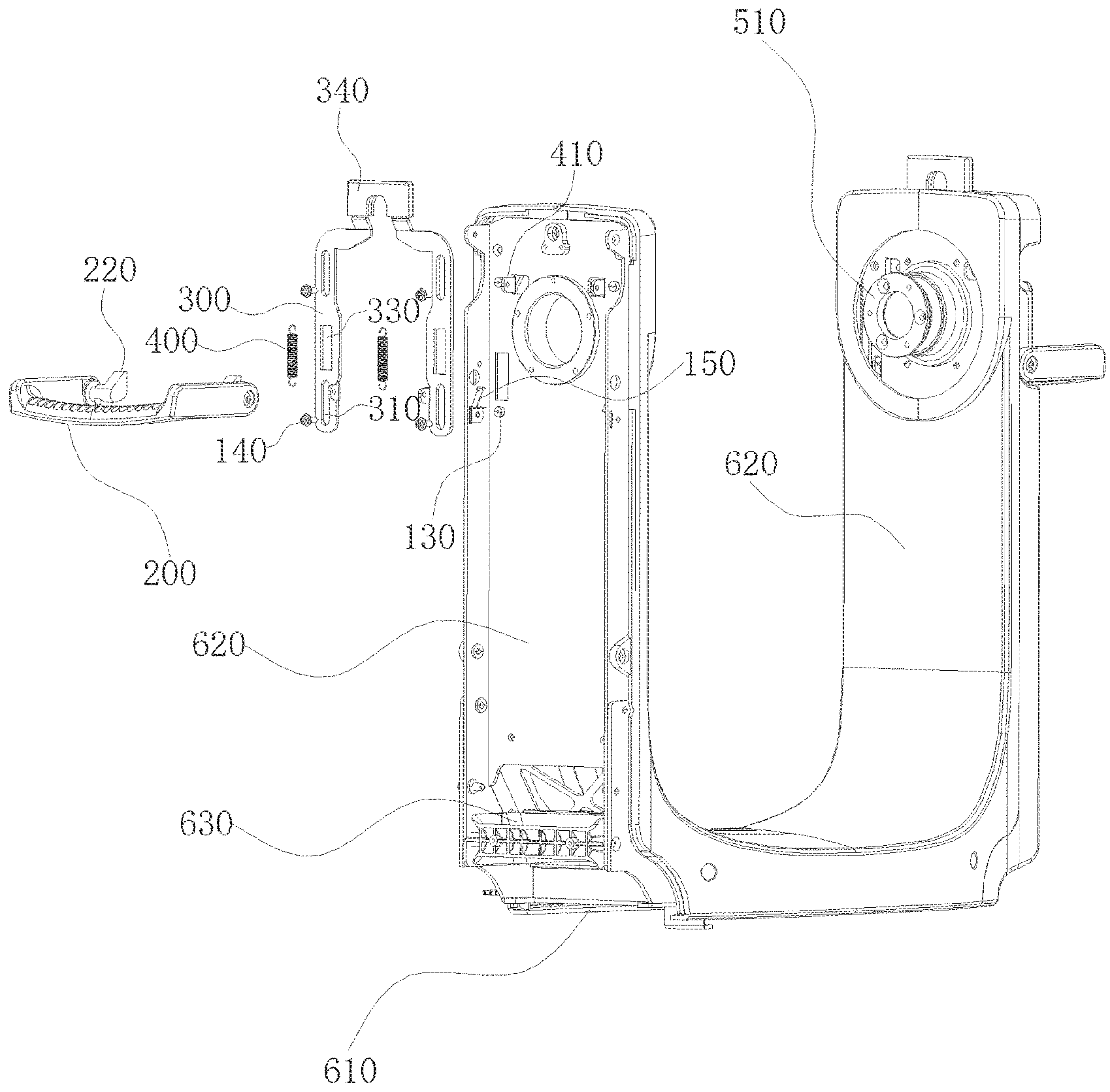
FIG. 5 is an exploded view of a pivoting arm according to an embodiment of the present invention, with a housing of the pivoting arm eliminated.

FIGS. 4 and 5 are provided a stage light fixture according to an embodiment of the present invention, which includes a light head 500 for projecting light beams, a pivoting arm 600 for supporting the light head 500 to rotate, a base 700 for supporting the pivoting arm 600 to rotate, and further includes the hand holding assembly mentioned above which is arranged on the pivoting arm 600. The light beams from the light head 500 can be projected to any direction with the cooperation of the pivoting arm 500 and the base 700. The hand holding assembly arranged on the arm 600 is convenient for the installer to hold the handle with less bending angle, compared to arranged on the case 700.

According to the present embodiment, the pivoting arm 600 has a transverse support plate 610 and two vertical support plates 620, the two vertical support plates 620 is respectively connected to the end of the transverse support plate 610 and each vertical support plate 620 has a hand holding assembly, and the base support 100 of each hand holding assembly is formed by the respective vertical support plate 620.

The joint of the transverse support plate 610 and vertical support plate 620 is provided with another handle 630, so that the stage light fixture can be lifted through the handle 630 or handle 200 of the hand holding assembly. In addition, the joint of the transverse support plate 610 and vertical support plate 620 is close to the base 700, it can save the handle on the base 700 due to the handle 630 at the joint.

In a preferable embodiment, the rotation shaft 210 of the handle 200 is arranged at the side of the pivoting shaft 510 of the light head 500 close to the base 700. In such case, when the handle 200 is designed upward at the folded state, there is enough space for the handle 200 and simultaneously ensuring the handle 200 not exceeding the upper end of the pivoting arm 600.

More preferably, the rotation shaft 210 of the handle 200 is arranged beneath the pivoting shaft 510 of the light head 500.

The housing 640 of the pivoting arm 600 is provided with an accommodating recess 641 according to the handle 200 at the folding state. The accommodating recess 641 serves to accommodate the handle 200 when at the folding state, the handle 200 thus may not project from the pivoting arm 600 too much and meet the requirement of aesthetic pleasing.

The locking plate 300 of the hand holding assembly is formed a pushing and pulling plate 340 for pushing and pulling of the locking plate 300, and the other end of the pushing and pulling plate 340 is extending from the housing 640 of the pivoting arm 600. As a result, the locking plate 300 can easily move between the first position and the second position by manual operation of the pushing and pulling plate 340.

The upper end of the housing 640 of the pivoting arm 600 is provided with a through hole, through which the pushing and pulling plate 340 is extending from the housing 640 of the pivoting arm 600.

Preferably, the handle 200 of the hand holding assembly is in U shape with two ends forming an opening of the U shape, the two ends of the U shape each is pivoted to the base support 100 via a rotation shaft 210 and arranged on the sides of the pivoting shaft 510 of the light head 500. Each rotation shaft 210 can be locked in reverse direction with the cooperation of one locking block 220 and one locking plate 300. The two locking plates 300 of each handle 200 share one pushing and pulling plate 340. In such configuration that the handle has two rotation shaft 210, and each rotation shaft 210 can be locked in reverse direction with the cooperation of one locking block 220 and one locking plate 300, the handle 200 thus is not prone to shaking and more stable, and the two locking plates 300 of each handle 200 sharing one pushing and pulling plate 340 allows the locking plate 300 to be pushed and pulled by one hand of the installer.

When at the folding state, the bottom of the U-shaped handle 200 can be located on the upper end of the pivoting arm 600 (this case is not shown in the figures), and can also be located at a middle portion of the pivoting arm 600 (shown in FIG. 4), at which the accommodating recess 641 of the housing 640 of the pivoting arm 600 is arranged.

Obviously, the above-mentioned embodiments of the present invention are only examples for clearly illustrating the present invention, rather than limiting the mode of implementation of the present invention. For those of ordinary skill in the art, changes or alterations in other different forms can also be made on the basis of the above description. It is not needed and also not possible to list all the modes of implementation here. Any modification, equivalent replacement, improvement, etc. made within the spirit and principle of the present invention shall be included within the protection scope of the claims of the present invention.

What is claimed is:

1. A reverse-lock hand holding assembly, comprising:

a base support;

a handle pivoted to the base support with a rotation shaft of the handle parallel to the base support, the handle has a folded state for storage and an unfolded state for lifting and transporting an object to be transported; and a locking plate, which is capable of sliding parallel to the base support and arranged on the base support for locking the handle against reverse rotation thereof, the locking plate has a first position corresponding to the folded state of the handle and a second position corresponding to the unfolded state of the handle, and the rotation shaft of the handle is provided with a locking block cooperated with the locking plate, wherein the locking plate is configured to release the handle and allow the handle to rotate from the folded state to the unfolded state in a first direction and rotate from the unfolded state to the folded state in a second direction opposite to the first direction, when the locking plate is at the first position, and the locking block is configured to be abutted against the locking plate toward the base support to limit the handle to reversely rotating in the second direction to the folded state from the unfolded state and the handle is allowed to lift and transporting the object to be transported in the second direction, when the locking plate is at the second position, wherein a resistance element is further provided, which is configured to continuously exert reverse a force to the handle during forward rotating to the unfolded state from the folded state, and wherein the rotation shaft of the handle is connected to a protrusion structure, the base support is provided with a spring sheet which is abutted against the protrusion structure to exert reverse force to the handle relative to a direction of rotation, the protrusion structure and the spring sheet together form the resistance element.

2. The reverse-lock hand holding assembly according to claim 1, wherein the locking plate is configured to translate relative to the base support between the first position and the second position.

3. The reverse-lock hand holding assembly according to claim 2, wherein the base support is provided with at least one guide post and the locking plate is provided with at least one elongated guide hole corresponding to the at least one guide post, and the locking plate is configured to change position through cooperation between the at least one guide post and the at least one guide hole.

4. The reverse-lock hand holding assembly according to claim 1, wherein when the handle is at the unfolded state and the locking plate is correspondingly at the second position, a locking plane of the locking block is abutted against a flat plane of the locking plate to limit the reverse rotation of the handle to the folded state.

5. The reverse-lock hand holding assembly according to claim 4, wherein the locking block further comprises an arc surface connected to the locking plane, the arc surface is configured to allow the handle to continuously forward rotate from the unfolded state and release the locking plate.

6. The reverse-lock hand holding assembly according to claim 1, wherein the locking plate is provided with an avoiding hole, a free end of the locking block is capable of freely entering and exiting from the avoiding hole with rotation of the handle when the locking plate is at the first position.

7. The reverse-lock hand holding assembly according to claim 1, wherein a free end of the locking block is abutted against the locking plate to limit moving of the locking plate when the handle is at the folded state and the locking plate is at the first position.

8. The reverse-lock hand holding assembly according to claim 7, wherein a reset element is further comprised, which is configured to continuously exert force to the locking plate to make the locking plate tend to move from the first position to the second position.

9. The reverse-lock hand holding assembly according to claim 1, wherein the handle is temporarily fastened to the base support by a snap-fitting structure when at the folded state.

10. A stage light fixture, comprising:

a light head for projecting light beams;

a pivoting arm for supporting the light head to rotate, which is provided with a hand holding assembly for lifting and transporting the stage light fixture; and a base for supporting the pivoting arm to rotate;

wherein the hand holding assembly comprises a handle pivoted to the pivoting arm with a rotation shaft of the handle parallel to the pivoting arm, the handle has a folded state for storage and an unfolded state for lifting and transporting the stage light fixture; and a locking plate which is capable of sliding parallel to the pivoting arm and arranged on the pivoting arm for locking the handle against reverse rotation thereof, the locking plate has a first position corresponding to the folded state of the handle and a second position corresponding to the unfolded state of the handle, and the rotation shaft of the handle is provided with a locking block cooperated with the locking plate, and wherein the locking plate is configured to release the handle and allow the handle to rotate from the folded state to the unfolded state in a first direction towards the base and rotate from the unfolded state to the folded state in a second direction away from the base, when the locking plate is at the first position; and the locking block is configured to be abutted against the locking plate toward the pivoting arm to limit the handle to reversely rotating in the second direction to the folded state from the unfolded state and the handle is allowed to lift and transport the stage light fixture in the second direction, when the locking plate is at the second position.

11. The stage light fixture according to claim 10, wherein the rotation shaft of the handle is arranged at a side of the pivoting arm of the light head close to the base.

12. The stage light fixture according to claim 10, wherein a housing of the pivoting arm is provided with an accommodating recess according to the handle at the folded state.

13. The stage light fixture according to claim 10, wherein the locking plate is connected to a pushing and pulling plate for pushing and pulling of the locking plate, and the pushing and pulling plate is extending from a housing of the pivoting arm.

14. The stage light fixture according to claim 13, wherein the handle of the hand holding assembly is in a U shape with two ends and an opening formed therebetween, the two ends of the U shape each is pivoted to the base support via one rotation shaft and arranged on two sides of the pivoting arm of the light head, the rotation shaft for each of ends of the U shape is reverse-locked with cooperation of one locking block and one locking plate, and the locking plate at each end of the U shape shares one pushing and pulling plate.

15. The stage light fixture according to claim 10, wherein the pivoting arm is provided with at least one guide post and the locking plate is provided with at least one elongated guide hole corresponding to the at least one guide post, and the locking plate is configured to change position through cooperation between the at least one guide post and the at least guide hole.

16. The stage light fixture according to claim 10, wherein when the handle is at the unfolded state and the locking plate is correspondingly at the second position, a locking plane of the locking block is abutted against a flat plane of the locking plate to limit the reverse rotation of the handle to the folded state.

17. The stage light fixture according to claim 16, wherein the locking block further comprises an arc surface connected to the locking plane, the arc surface is configured to allow the handle to continuously forward rotate from the unfolded state and release the locking plate.

18. The stage light fixture according to claim 10, wherein the hand holding assembly further comprises a reset element, which is configured to continuously exert a force to the locking plate to make the locking plate tend to move from the first position to the second position.

19. A reverse-lock hand holding assembly, comprising:

a base support;

a handle pivoted to the base support with a rotation shaft of the handle parallel to the base support, the handle has a folded state for storage and an unfolded state for lifting and transporting an object to be transported; and a locking plate, which is capable of sliding parallel to the base support and arranged on the base support for locking the handle against reverse rotation thereof, the locking plate has a first position corresponding to the folded state of the handle and a second position corresponding to the unfolded state of the handle, and the rotation shaft of the handle is provided with a locking block cooperated with the locking plate, wherein the locking plate is configured to release the handle and allow the handle to rotate from the folded state to the unfolded state in a first direction and rotate from the unfolded state to the folded state in a second direction opposite to the first direction, when the locking plate is at the first position, and the locking block is configured to be abutted against the locking plate toward the base support to limit the handle to reversely rotating in the second direction to the folded state from the unfolded state and the handle is allowed to lift and transporting the object to be transported in the second direction, when the locking plate is at the second position;

wherein the locking plate is provided with an avoiding hole, a free end of the locking block is capable of freely entering and exiting from the avoiding hole with rotation of the handle when the locking plate is at the first position; and wherein a free end of the locking block is abutted against the locking plate to limit moving of the locking plate when the handle is at the folded state and the locking plate is at the first position.

20. The reverse-lock hand holding assembly according to claim 19, wherein the locking plate is configured to translate relative to the base support between the first position and the second position.

* * * * *